HARTSON & WOOLSEY.
Centrifugal Machine.
No. 2,302.
Reissued July 10, 1866.
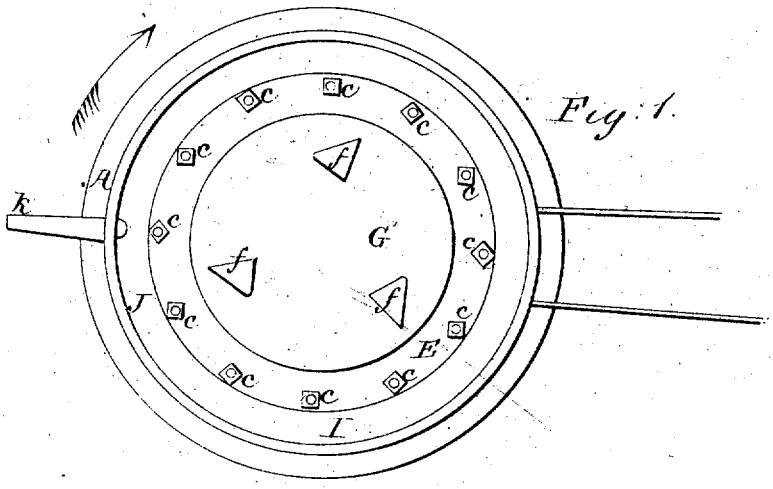
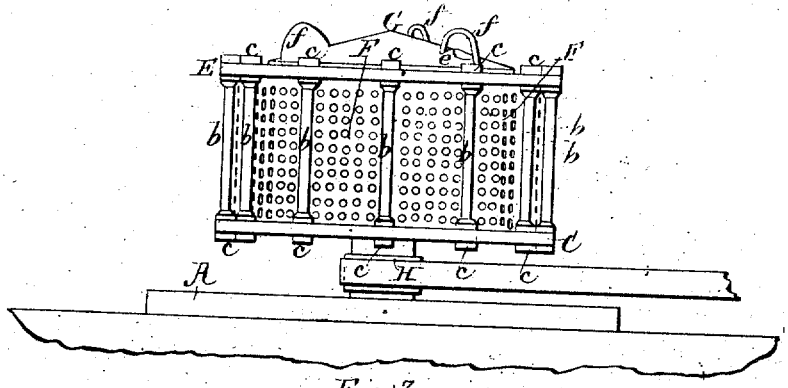
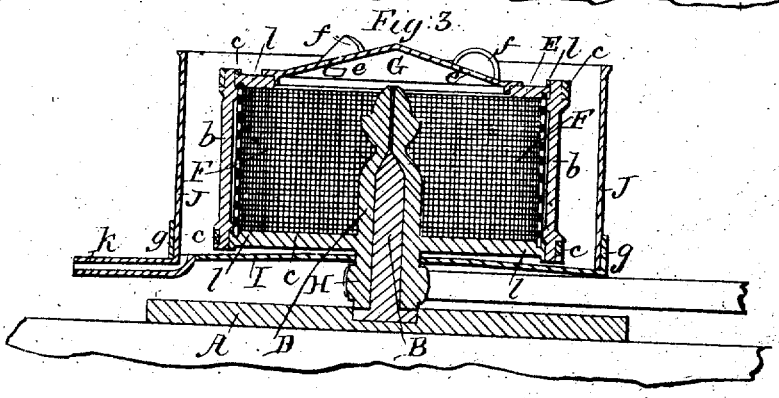

UNITED STATES PATENT OFFICE.

GEO. B. HARTSON AND E. J. WOOLSEY, OF NEW YORK, N. Y.

IMPROVED CENTRIFUGAL MACHINE.

Specification forming part of Letters Patent No. 52,569, dated February 13, 1866; Reissue No. 2,302, dated July 10, 1866.

*To all whom it may concern:*

Be it known that we, G. B. HARTSON and E. J. WOOLSEY, of the city, county, and State of New York, have invented certain new and Useful Improvements in Apparatus for Separating the Liquid Parts from Sugar or other Substances; and we do hereby declare that the following is a full, clear, and exact description of the same, reference being had to the accompanying drawings, making part of this specification, in which—

Figure 1 is a plan of the apparatus. Fig. 2 is an elevation of the revolving cylinder or separator, the external pan which receives the liquid parts after they are separated being omitted. Fig. 3 is a vertical section of the apparatus, taken through the center.

The same letters indicate like parts in all the figures.

In the apparatus for depurating sugar or separating liquid from solid substances by centrifugal action great velocity is required, and if, as is frequently the case, the material to be depurated or deprived of liquid matter be not in weight equally distributed around the center of motion and at equal distances from the axis, (which is often impracticable,) a tremulous motion is induced which increases with the increased velocity and exerts an injurious action, which in a short time destroys the mechanism, however strong the structure may be.

Heretofore the vessel or separator containing the material to be acted upon has been mounted on a shaft with journals at each end and connected with the said shaft by means of arms, the pulley for receiving the driving-belt being mounted on the shaft and necessarily at some distance from both journals, as the belt must of necessity be tight. This tension draws and slightly bends the shaft, which of itself carries the weight in rotation out of equilibrium and produces the injurious tremulous motion above referred to.

The first part of our invention relates to a mode of constructing and mounting the separator with a view to retain the rotating post of the apparatus in a true central position, and at the same time to prevent the centrifugal force acting on the unequally-distributed weight from producing the injurious tremulous motion above referred to; and to this end this part of our invention consists in constructing the separator which is to contain the saccharine matter to be defecated, or other matter to be acted upon, on a strong horizontal plate having a hollow centered hub fitted to rest and turn on a strong stud attached to or making part of a base-plate, the said hub being provided with a pulley near to and below the bottom plate of the separator, to receive the driving-belt. In this way all tendency to vibration is avoided, for any tendency to bend the stud on which the hollow hub turns will not shift the apparatus or any portion of it relatively to the axis of rotation.

Prior to the invention of this improvement it was common to make these machines with a central shaft rising from the base of the machine to a journal-box fixed in stout beams or frame-work in or upon the ceiling of the apartment in which it was placed, and the driving-belt was arranged on a pulley above the machine. This central shaft prevented convenient access to the interior of the machine and involved much expense in the construction of the upper journals and the security of the upper end of the shaft. The use of this shaft, owing to its great weight, also required increased power to drive the machine, with increased expense for fuel, and also rendered the machine cumbersome for transportation and incapable of outdoor work unless a strong cross-frame and braces were erected over the machine in which to place the said upper journal. Such frame greatly added to the expense of the machine, increased its bulk, and prevented convenient approach thereto by workmen and attendants.

All of the above objections and difficulties are overcome in our improvement. We dispense with the rising central shaft, upper journal, frame, and braces, with all their inconveniences, and we greatly reduce the cost of constructing the machine as well as the expense of driving it.

The second part of our invention relates to the method of introducing a current or currents of air into the separator to aid in the effect to be produced on the substance under treatment. Heretofore the upper part of the separator has been made either entirely open, except the arms connecting the rim with the shaft, or entirely closed.

This part of our invention consists in providing the top plate or cover of the separator with apertures provided with funnel-shaped bonnets or hoods, so that when in motion currents of air will be forced in and through the apparatus to aid the centrifugal force in producing the desired effect on the substance or substances under treatment.

To enable others skilled in the art to make and use our invention, we will proceed to describe its construction and operation.

A is the foundation or bed plate, of circular or other suitable form, having a strong stud, B, inserted in a vertical position in its center and firmly secured by keying or otherwise.

C is a disk or plate of cast iron, of circular or other shape, which forms the bottom of the cylinder or separator. It has a deep socket, D, cast upon, it projecting a considerable distance above and below. This socket is bored and the stud B fitted to it with the greatest accuracy, the back of the hole in the socket resting on the top of the stud or the bottom of the socket resting on the bed-plate A. The bearing is lubricated by an oil-cup, *a*, at the top. A drum, H, for receiving motion from a belt, is cast on that part of the socket below the plate.

E is a ring or annular plate of cast-iron, of the same or nearly the same external diameter as the plate C. It is intended to form the top of the cylinder or separator, and is supported by a series of pillows or upright bolts, *b b*, these ends passed through holes near its outer edges and those of the plate C, the said bolts or pillars being provided with shoulders to keep the plates at the proper distance apart suitable to the depth of the cylinder. The ends of the bolts which project through the plates are secured and provided with nuts *c c* which hold the plates together. That part F F of the cylinder constituting the sides or periphery is formed of sheet-copper or other suitable metal closely perforated all over and lined with wire-gauze, (see Figs. 2 and 3,) or may be made entirely of strong wire-gauze. The edges of the sheet-copper and wire-gauze are pressed closely together and fit in circular grooves *l l* turned in the under face of the plate E and the upper face of that *c*, for the purpose of receiving them, being put in place before these plates are secured together, and secured by tightening up the nuts.

G is the cover of the cylinder or separator, made of sheet or cast iron or other metal, and is provided with apertures *e e*, (see Fig. 3,) covered by hoods or funnel-mouths *f f*, of conical form, opening in the direction in which the cylinder is intended to revolve.

I is the bottom of the external pan, which is of cast-iron and slightly conical in form, or concave on its under side and convex on its upper side, having an opening in the center to allow the sockets of the cylinder or separator to pass through it, and a rim, *g*, projecting upward, within which fits a sheet-iron cylinder, J, forming the sides of the pan. A tube or spout, K, opens outward from it. The bottom I is supported by feet which may be bolted or otherwise secured to the foundation or bed plate A.

The operation of the apparatus is similar to that of other apparatus in which the separation is effected by centrifugal force. Rotary motion being given to the cylinders C E F in the direction in which the mouths of the hoods or funnels *f f* open, the sugar or other substances with which the cylinder is charged is thrown with considerable force against the sides or periphery E E and the liquid parts or moisture expressed and expelled through the gauze and perforated metal. Strong currents or drafts of air will be caused by the revolutions of the cylinder to rush into it through the hoods *f f* and apertures *e e*, escaping through the sides, assisting greatly in separating the liquids and expelling them effectually. The liquids thus expelled are caught on the sides and bottom of the external pan or receiver I J, from which they run off through the pipe or spout K, and are caught by a vessel placed to receive them.

We do not claim to have invented the mode of separating liquid parts from sugar or other substance by placing them in a revolving cylinder against the sides of which they are thrown by centrifugal force, as that has been already effected; but

What we claim as our invention, and desire to secure by Letters Patent, is—

1. Supporting and driving the centrifugal separator from below, substantially as and for the purpose herein shown and described.

2. The method of constructing the centrifugal separator with a hollow hub in the center of the lower plate thereof, as described, the said hub being provided with a pulley for the driving-belt below the bottom plate and fitted to run on and combined with the stud of the base-plate, in the manner and for the purpose specified.

3. The said centrifugal separator, in combination with the cap or cover provided with holes or channels covered with funnel-shaped hoods, as described, to force currents of air in and through the said apparatus to aid in effecting the separation, as described.

GEO. B. HARTSON.
E. J. WOOLSEY.

Witnesses for Hartson:
WM. F. MCNAMARA,
ALEX. F. ROBERTS.
Witnesses for Woolsey:
A. F. CUSHMAN,
ELLIOT RICHARDSON.